US012378123B2

(12) United States Patent
Shen et al.

(10) Patent No.: US 12,378,123 B2
(45) Date of Patent: Aug. 5, 2025

(54) CHROMIUM-FREE, IRON-BASED CATALYST FOR WATER GAS SHIFT REACTION AND METHODS OF USE THEREOF

(71) Applicant: Research Triangle Institute, Research Triangle Park, NC (US)

(72) Inventors: Jian-Ping Shen, Research Triangle Park, NC (US); Brian Turk, Durham, NC (US); Pradeepkumar Sharma, Research Triangle Park, NC (US); David Denton, Mt. Pleasant, SC (US)

(73) Assignee: Research Triangle Institute, Research Triangle Park, NC (US)

( * ) Notice: Subject to any disclaimer, the term of this patent is extended or adjusted under 35 U.S.C. 154(b) by 940 days.

(21) Appl. No.: 17/609,806

(22) PCT Filed: Apr. 22, 2020

(86) PCT No.: PCT/US2020/029217
§ 371 (c)(1),
(2) Date: Nov. 9, 2021

(87) PCT Pub. No.: WO2020/236381
PCT Pub. Date: Nov. 26, 2020

(65) Prior Publication Data
US 2022/0219992 A1 Jul. 14, 2022

Related U.S. Application Data

(60) Provisional application No. 62/849,251, filed on May 17, 2019.

(51) Int. Cl.
| | |
|---|---|
| *B01J 23/80* | (2006.01) |
| *B01J 8/24* | (2006.01) |
| *B01J 19/00* | (2006.01) |
| *B01J 23/72* | (2006.01) |
| *B01J 23/78* | (2006.01) |
| *B01J 35/31* | (2024.01) |
| *B01J 35/61* | (2024.01) |
| *C01B 3/16* | (2006.01) |
| *C01B 32/50* | (2017.01) |

(52) U.S. Cl.
CPC .............. *C01B 32/50* (2017.08); *B01J 8/24* (2013.01); *B01J 19/0093* (2013.01); *B01J 23/72* (2013.01); *B01J 23/78* (2013.01); *B01J 23/80* (2013.01); *B01J 35/31* (2024.01); *B01J 35/613* (2024.01); *C01B 3/16* (2013.01); *C01B 2203/0283* (2013.01)

(58) Field of Classification Search
CPC ............. B01J 23/72; B01J 23/78; B01J 23/80
See application file for complete search history.

(56) References Cited

U.S. PATENT DOCUMENTS

| | | | |
|---|---|---|---|
| 5,395,813 | A | 3/1995 | Clavenna et al. |
| 5,476,877 | A | 12/1995 | Clavenna et al. |
| 7,259,286 | B2 | 8/2007 | Jothimurugesan et al. |
| 7,964,114 | B2 | 6/2011 | Chen et al. |
| 2009/0152500 | A1 | 6/2009 | Chen et al. |
| 2013/0309165 | A1 | 11/2013 | Koo et al. |
| 2014/0221193 | A1 | 8/2014 | Lee et al. |

FOREIGN PATENT DOCUMENTS

| | | |
|---|---|---|
| CN | 101518737 A | 9/2009 |
| CN | 101607201 A | 12/2009 |
| RU | 2491119 C2 | 8/2013 |
| RU | 2500470 C1 | 12/2013 |
| RU | 2524951 C2 | 8/2014 |

OTHER PUBLICATIONS

CNIPA; Office Action from corresponding Chinese Patent Application No. 202080044999.3 dated Nov. 29, 2023, 12 pages.
SAIP; Office Action from corresponding Saudi Patent Application No. 521430867 with English Translation, mailed Mar. 20, 2024, 13 pages.
FIPS; Russian Search Report for Russian Patent Application No. 2-21132980 dated Jun. 22, 2023, 4 pages.
FIPS; Office Action from corresponding Russian Patent Application No. 201132879, mailed Jul. 25, 2023,, 11 pages.
Kolesnikov, I. M. et al.: "Solid Catalysts, Their Structure, Composition and Catalytic Activity", Ministry of Education of the Russian Federation, Gubkin Russian State University of Oil and Gas, Moscow, 2000, p. 10, 4 pages.
EPO; Extended European Search Report for European Patent Application No. 20810183 dated May 15, 2023, 6 pages.
ISA/KR; International Search Report and Written Opinion for International Patent Application No. PCT/US20/29217 dated Aug. 10, 2020, 12 pages.
WIPO; International Preliminary Report on Patentability for International Patent Application No. PCT/US2020/029217 dated Dec. 2, 2021, 9 pages.
Intellectual Property India; Examination Report for Indian Patent Application No. 202117052786, dated Sep. 27, 2023, 6 pages.

*Primary Examiner* — Stuart L Hendrickson
(74) *Attorney, Agent, or Firm* — NK Patent Law

(57) ABSTRACT

A chromium-free catalyst for use in a fluidized bed reactor is described. The catalyst comprises 45-70 wt % $Fe_2O_3$, 5-15 wt % CuO, 20-35 wt % $Al_2O_3$, 10-20 wt % ZnO, and 1-15 wt % $K_2CO_3$. The catalyst has a Davison Index (DI %) of less than or equal to 15. A method for converting carbon monoxide (CO) into carbon-dioxide ($CO_2$) using the catalyst is described. The method includes introducing $H_2O$ and CO into a fluidized bed reactor having an operating temperature between about 375° C. and about 450° C. and comprising the chromium free catalyst. The CO conversion is at least 60%.

9 Claims, 8 Drawing Sheets

CHROMIUM-FREE, IRON-BASED CATALYST FOR WATER GAS SHIFT REACTION AND METHODS OF USE THEREOF

CROSS-REFERENCE TO RELATED APPLICATIONS

This application is a U.S. National Stage application of International Patent Application No. PCT/US20/29217, filed on Apr. 22, 2020, which claims the benefit of U.S. Provisional Patent Application No. 62/849,251, filed May 17, 2019, the entire contents of which are incorporated herein by reference.

FEDERAL FUNDING LEGEND

The invention was made with support under Cooperative Agreement No: DE-FE0023577 awarded by the United States Agency of the Department of Energy. The Government has certain rights in the invention.

TECHNICAL FIELD

A chromium-free catalyst for use in fluidized bed reactors is described herein. In particular, a chromium-free catalyst for use in high-temperature water gas shift reactions is described.

BACKGROUND

The water gas shift (WGS) reaction involves conversion of $H_2O$ and CO to $H_2$ and $CO_2$. The WGS reaction is generally more favored thermodynamically at lower temperatures. The WGS reaction is typically performed in two stages: a high temperature shift (HT-WGS) reaction followed by a low temperature shift (LT-WGS) reaction. Typically, different catalysts are used for HT-WGS and LT-WGS. In most industrial WGS processes, Fe/Cr-based mixed oxides are used as catalysts for the HT-WGS and Cu/Zn/Al mixed oxides are used as LT-WGS catalysts. Conventionally, HT-WGS catalysts are in the form of tablets and are used in fixed-catalyst bed applications.

Exemplary, currently available, fresh HT-WGS catalysts are primarily composed of about 70-90% $Fe_2O_3$, 5-15% $Cr_2O_3$ and miscellaneous other components, such as CuO, $CO_2O_3$ and/or MgO. Fresh Fe/Cr catalyst is pre-reduced before being used in the reaction, in order for $Fe_2O_3$ to be carefully changed into its catalytically active $Fe_3O_4$ phase, but not overly reduced into FeO or metallic Fe.

The life time of Fe/Cr catalyst is an average of 3-5 years without exchanging with fresh catalyst. The activity decrease is primarily due to the thermal sintering of the $Fe_3O_4$ magnetite phase. In commercial operation, increasing the reaction temperature can compensate for a decrease in activity.

In Fe/Cr catalyst, the major active phase is the partially reduced $Fe_3O_4$. The chromium component of the catalyst is commonly recognized as a stabilizer to prevent thermal sintering of $Fe_3O_4$ and loss of surface area of the catalyst. It is generally accepted that a relatively high surface area benefits catalyst performance, for example, by enhancing catalyst activity. Today, it is generally understood that chromium acts as a textural (preventing thermal sintering) and a functional (enhancing redox efficiency $Cr^{3+} \leftrightarrow Cr^{6+}$, $Cr_2O_3 \leftrightarrow CrO_3$) promoter in Fe/Cr HTS catalysts.

However, it is also known that hexavalent chromium ($Cr^{6+}$) is a strong carcinogen, which endangers human health and the environment. Exposure through inhalation and drinking water causes cancer and serious damage to human organs and skin. In contrast, trivalent chromium ($Cr^{3+}$) has very low toxicity and is a nutrient for the human body. Concerns about the environmental hazard and toxicity of hexavalent chromium have been raised in the US and Europe. The environmental protection agency (EPA) and The Occupational Health and Safety Administration (OSHA) under the U.S. Department of Labor have published many practical guidelines for the identification and assessment of hexavalent chromium and have enforced strict regulations regarding worker exposure to hexavalent chromium in several industries. In Europe, the European Restriction of Hazardous Substances (RoHS) banned the use of six hazardous materials, including hexavalent chromium, in all electronic-electrical equipment. It is expected that these regulations will be expanded to cover entire industries.

For Fe/Cr HTS catalyst, $Cr^{+6}$ ($CrO_3$) exists in active and the spent catalyst, and $Cr^{+6}$ is water-soluble and can be leached from the catalyst by condensed steam or cold water. Also some of the $Cr^{+3}$ ions that are not precipitated can be oxidized into $Cr^{+6}$ when the catalyst is calcined at high temperature. Therefore, because of environmental and health concerns, it is desirable to develop HT-WGS catalysts without a chromium component.

Some HT-WGS iron-based catalysts containing minimal Cr or no Cr have been reported in the literature. Such catalysts can be summarized into two major groups: 1) Fe/Al-based catalysts, which are promoted with Cu, Ce, or Cu/Ce; and 2) Fe/Ni-based HT-WGS catalysts, which are promoted with Cs, Zn, Al, Ce and Zr. Some of the chromium-free catalysts exhibit catalytic activity but not the level of commercial Fe/Cr catalysts. Moreover, studies have shown that a single substitute promotor is not able to provide the role of both preventing $Fe_3O_4$ sintering and enhancing redox efficiency in the way chromium does in Fe/Cr catalysts. Moreover, all of the low chromium/chromium-free catalysts have been considered for fixed-bed reactor applications.

Currently available HT-WGS catalysts, whether they contain chromium or not, are designed for use in fixed-bed reactors. The currently available HT-WGS catalysts are not wear resistant enough for sustained use in a fluidized bed. That is, the available catalyst materials break down relatively quickly and easily in fluidized bed service. It is desirable to provide a HT-WGS catalyst that can be sustainably used in fluidized bed reactors. Moreover, it is desirable for the HT-WGS catalyst that can be used in a fluidized bed to be chromium free.

SUMMARY OF THE DISCLOSURE

In a first aspect of the invention, a fluidized and attrition-resistant chromium-free catalyst for use in water gas shift reaction in a fluidized bed reactor includes 45-70 wt % $Fe_2O_3$, 5-15 wt % CuO, 20-35 wt % $Al_2O_3$, 10-25 wt % ZnO and 1-15 wt % $K_2CO_3$. The catalyst has a Davison Index (DI) of less than or equal to 15.

In a feature of this aspect, the catalyst comprises up to 15 wt % of a potassium component. The potassium component may be $K_2CO_3$. For example, it may be about 4-6 wt % $K_2CO_3$. In another feature of this aspect, the catalyst may comprise about 50-60 wt % $Fe_2O_3$. The catalyst may comprise about 20-25 wt % $Al_2O_3$. Additionally, the catalyst may comprise about 10-15 wt % ZnO. In an additional feature, the catalyst may comprise about 5-10 wt % CuO and optionally 0 to 15 wt % MgO and/or optionally 0 to 15 wt % $CeO_2$.

In a further feature of this aspect, the Davison Index is between about 5 and about 7. In another feature of this aspect, the catalyst has a BET surface area of about 10-60 $m^2/g$. In an additional feature, the catalyst has a density of about 0.8 to about 1.8 g/ml.

In another feature of this aspect, the catalyst results in a CO conversion of at least 60% when used for a water gas shift reaction in a fluidized bed reactor at a reaction temperature between about 375° C. and 410° C. With further regard to this feature, the catalyst may result in a CO conversion of at least 70% when used for a water gas shift reaction in a fluidized bed reactor at a reaction temperature between about 375° C. and 410° C.

In a second aspect of the invention, a method for converting carbon monoxide (CO) into carbon-dioxide ($CO_2$), includes introducing $H_2O$ and CO with a molar ratio between 1:1 to 3:1 into a fluidized bed reactor having an operating temperature, the reactor comprising a chromium free catalyst, wherein the catalyst has a Davison Index of less than or equal to 7, and wherein the CO conversion at operating temperatures between about 375° C. and about 450° C. is at least 60%. In a feature of this aspect, the CO conversion at operating temperatures between about 375° C. and about 450° C. is between about 60% and 85%. In another feature of this aspect, the CO conversion at operating temperatures between about 375° C. and 410° C. is at least about 70%. For example, the CO conversion at operating temperatures between about 375° C. and 410° C. may be at least about 75%.

In a further feature of this aspect, the selectivity to methane formation at operating temperatures between about 375° C. and about 450° C. is less than 2%. In an additional feature of this aspect, an average CO conversion of at least 60% at operating temperatures between about 375° C. and about 450° C. is maintained for at least 200 hours. In yet another feature, the catalyst comprises $Fe_2O_3$, CuO, $Al_2O_3$, and ZnO.

BRIEF DESCRIPTION OF THE DRAWINGS

The foregoing aspects and other features of the disclosure are explained in the following description, taken in connection with the accompanying drawings, wherein:

FIG. 9 is a chart showing catalyst performance of an exemplary embodiment as a function of TOS (hrs).

DETAILED DESCRIPTION

Figure 1:
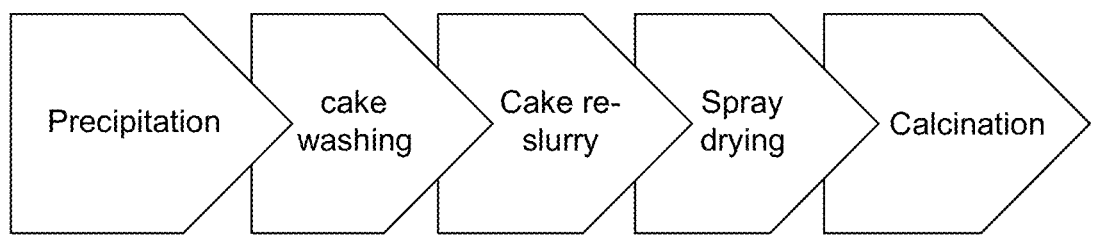
FIG. 1 is a schematic representation of the catalyst synthesis process.

For the purposes of promoting an understanding of the principles of the present disclosure, reference will now be made to embodiments and specific language will be used to describe the same. It will nevertheless be understood that no limitation of the scope of the disclosure is thereby intended, such alteration and further modifications of the disclosure as illustrated herein, being contemplated as would normally occur to one skilled in the art to which the disclosure relates.

Articles "a" and "an" are used herein to refer to one or to more than one (i.e. at least one) of the grammatical object of the article. By way of example, "a catalyst" means at least one catalyst and can include more than one catalyst.

Unless otherwise defined, all technical terms used herein have the same meaning as commonly understood by one of ordinary skill in the art to which this disclosure belongs.

Described herein is a chromium-free catalyst for use in a fluidized bed reactor. In embodiments, the chromium-free catalyst is for use in a water-gas shift reaction, in particular a high-temperature water-gas shift reaction. In embodiments, the chromium-free catalyst is for use in a fluidized bed reactor. In this regard, in embodiments, the chromium-free catalyst has a Davison Index (DI) of less than or equal to 7, or it has a comparable DI value or performance criterion to commercial fluidized cracking catalyst (FCC) as measured under the same conditions.

The chromium-free catalyst comprises multiple components, including $Fe_2O_3$ and additional components, such as promoters. Exemplary additional components may include CuO, $Al_2O_3$, and ZnO, each of which will be described more fully below. In embodiments, the catalyst may comprise $Fe_2O_3$ in an amount of less than 70 wt % of the total weight of the compound. In embodiments, the catalyst may further comprise a potassium component. For example, the potassium component may be $K_2CO_3$. For example, the potassium component may be 4-8 wt % $K_2CO_3$.

As mentioned previously, it would be desirable to have a high-temperature water-gas shift (HT-WGS) catalyst that can be sustainably used in fluidized bed reactors. Moreover, it would be desirable for the HT-WGS catalyst for use in a fluidized bed to be chromium free.

Conventional chromium-containing HT-WGS catalysts primarily comprise iron oxide ($Fe_2O_3$) and chromium oxide ($Cr_2O_3$) with compositional percentages of about 74-89% and 6-14%, respectively. In these catalysts, iron oxide is the major active component while chromium oxide is considered to be a stabilizer of the active reduced iron oxide ($Fe_3O_4$). Additionally, a small amount of additive(s) to enhance catalyst performance can usually be found in commercial HT-WGS catalyst.

Traditionally, commercially available HT-WGS catalysts have been used in fixed-bed reactor applications. These commercially-available HT-WGS catalysts, within desirable particle size ranges, are too weak to be used for fluidized-bed applications. Thus, a new catalyst formulation that is strong enough to withstand fluidized bed conditions is desired.

An exemplary embodiment of the chromium-free catalyst described herein comprises multiple components, including $Fe_2O_3$, CuO, $Al_2O_3$, and ZnO.

Iron oxide ($Fe_2O_3$) provides an active component for the HT-WGS catalyst. As mentioned above, the amount of iron oxide in conventional HT-WGS catalysts is typically in a range of about 74 to 89 wt %. In contrast, the iron oxide content in the chromium-free catalysts described herein is generally less than 70 wt % $Fe_2O_3$. For example, the iron oxide component may be present in an amount of 45-70 wt % of the total catalyst weight. The iron oxide content can influence the catalyst activity and catalyst particle attrition.

Catalyst promoters can play multiple roles in HT-WGS catalyst formulation. For example, they can improve catalyst activity thereby increasing CO conversion during the water gas shift reaction. Promotors can also minimize undesirable hydrocarbon formation, especially methane formation. Lastly, promoters can potentially lower the need for relatively high steam/carbon ratios.

Different types of promoters can be used with iron oxide in the chromium-free catalyst described herein. For example, the addition of a small amount of active components such as Cu, Co, Ru, Ni, Pt, Os, Au, Pd, Rh, Pb, and Ag, can potentially improve catalyst activity. As an example, copper can be used as an effective promoter. Copper can increase catalyst activity and can also potentially lower the need for a relatively high steam/carbon ratio. Thus, varying copper content can affect catalyst performance, undesired methane formation, and catalyst stability.

HT-WGS catalysts with varying copper content of up to 10 wt % were tested. Table 1 provides a listing of the copper content in the exemplary catalyst formulations that were prepared. Additional components are not shown in Table 1. Amounts shown are in wt % of catalyst weight.

TABLE 1

Catalyst Samples with varying Copper Content

|  | Sample B | Sample F | Sample G | Sample H |
|---|---|---|---|---|
| CuO | ~6 | 0 | ~10 | ~10 |
| $Fe_2O_3$ | up to 65 | up to 65 | up to 65 | up to 65 |

The presence of base oxide (alkali group, for example K) in the catalyst can suppress formation of the unfavorable by-product methane. Thus, in embodiments, a small amount of group 1 (K) or group 2 (Mg) alkali can be added to the catalyst formulation. HT-WGS catalysts with different potassium content (as $K_2CO_3$) up to 8.0 wt % were tested. Table 2 provides a listing of the potassium content in the exemplary catalyst formulations that were prepared. Additional components are not shown in Table 2. Amounts shown are in wt % of catalyst weight.

TABLE 2

Catalyst Samples with varying Potassium Content

|  | Sample B | Sample I |
|---|---|---|
| $Fe_2O_3$ | up to 65 | up to 65 |
| $K_2CO_3$ | ~4.5 | 8 |

Reducing the amount of steam used during the HT-WGS reaction can provide an economic benefit. Using a fluidized bed instead of a conventional fixed bed reactor can reduce the amount of steam used during a HT-WGS reaction. In an exemplary embodiment, a chromium-free catalyst used in a fluidized bed, and which includes copper, can decrease the steam/carbon ratio to 2.0, which can provide an economic benefit through cost savings due to reduced steam use.

When using fluidized-bed processes, catalyst attrition is an important consideration. Catalyst attrition involves the breakdown or slow destruction of the catalyst, which can present catalyst performance concerns. For example, an adverse consequence of attrition is the generation of fines and the resulting loss of valuable catalyst material.

Catalyst attrition can be affected by the composition and physical characteristics of the catalyst and by catalyst processing conditions. For example, catalyst density is relevant for catalyst attrition and for use of the catalyst in a fluidized bed application. In general, catalysts used fluidized beds have a density of at least 0.8 g/ml. Exemplary embodiments of the chromium-free catalyst described herein have a density of at least 0.8 g/ml. For example, the catalyst may have a density between about 0.8 and 1.8 g/ml. For a given catalyst composition, synthesis conditions, such as precipitation temperature, slurry viscosity, pH control, acid addition, etc., and post synthesis conditions, such as calcination temperature, ramp rate and atmosphere, all play a role in determining the physical properties of the resultant catalyst formulation.

When developing the chromium-free catalyst described herein, it was determined that higher iron content positively impacted catalyst activity. However, unfortunately, higher iron content also resulted in poorer catalyst attrition resistance. Therefore, a catalyst composition that balances activity and attrition resistance includes iron as well as other components, including promoters. For the chromium-free catalyst described herein, it is desired to have a catalyst attrition resistance at least as good as the attrition resistance of fluid catalytic cracking (FCC) catalysts, which generally have a Davison Index (DI) value of less than or equal to 7%. The Davison Index, which can be obtained by the procedure outlined in U.S. Pat. No. 3,650,988, is used to measure the resistance to attrition. It is a measure of the hardness of a catalyst or how well it resists wearing under test conditions. A catalyst that possesses a low Davison Index will last longer than a catalyst that has a high Davison Index. It can be expressed using the following formula: Davison Index (DI %)=(0-20 micron materials formed during test)/(original 20+micron fraction)*100%.

Exemplary embodiments of the chromium-free catalyst described herein can match performance of commercially-available fixed-bed catalyst in catalyst activity and stability and are better or equivalent to commercial FCC catalysts in terms of attrition resistance. Additionally, exemplary embodiments of the chromium-free catalysts exhibit long-term stable activity of up to about 75% CO conversion. Accordingly, the chromium-free catalyst can have long-term stable activity of up to about 75% CO conversion.

As mentioned previously, HT-WGS catalysts are typically in service for 3-5 years. Exemplary embodiments of the chromium-free catalyst showed stable activity for up to 500 hours. Activity for this extended period of time is expected to be representative of activity for significantly longer lengths of time. For example, the chromium free catalyst has stable activity for up to 200, 300, 400, or 500 hours. Moreover, the chromium free catalyst may have stable activity for up to 365, 730, 1095, 1460, and/or 1825 days and/or any number days in between.

Exemplary embodiments of the chromium-free catalyst exhibit a particle attrition resistance of DI % between 1.4 and 6.0, which is comparable to that exhibited by FCC catalysts, many of which have DI % of 6. FCC catalysts are commercially used effectively in fluidized bed applications. Accordingly, a catalyst having a DI % indicating an attrition resistance at least as strong as an FCC catalyst is suitable for use in a fluidized bed application. Exemplary embodiments of the chromium-free catalyst have a DI % of less than 6%, less than 5.75%, less 5.5%, less than 5.25%, less than 5%, less than 4.5%, and/or less than 4%.

An increase in iron oxide content, which is the most active component in the catalyst, can help improve catalyst activity, but can also make the catalyst weaker. Thus, a high iron oxide content may render a catalyst too weak to sustain a transport reactor application (i.e., have an increase in DI %).

Thus, a suitable iron oxide content in the catalyst to maximize activity and have reasonable particle attrition may be between about 45-65 wt %.

Different promoters can be integrated into the catalyst formulation. The presence of copper improves CO conversion during the water-gas-shift reaction, but a copper oxide content more than 10% may weaken the catalyst particles. The presence of potassium may help depress the formation of by-product methane. Testing indicated that other additives, such as MgO and $CeO_2$, did not have a positive impact on catalyst performance.

In the water gas shift reaction, carbon monoxide and water are converted to carbon dioxide and hydrogen. The formula for the water gas shift reaction can be written as:

$$CO+H_2O \rightleftharpoons CO_2+H_2$$

The chromium-free catalyst described herein can be used in water gas shift reactions performed in fluidized bed reactors. The chromium-free catalyst enables a method for converting carbon monoxide (CO) into carbon-dioxide ($CO_2$), comprising introducing $H_2O$ and CO into a fluidized bed reactor having an operating temperature between about 375° C. and about 450° C., wherein the reactor comprises the chromium free catalyst, which has a Davison Index of less than or equal to 7, and wherein the CO conversion at the operating temperature is at least 60%. For example, the CO conversion at the operating temperature can be greater than about 60%, 65%, 70%, 71%, 72%, 73%, 74%, 75%, 76%, 77%, 78%, 79%, and/or 80%.

The chromium free catalyst described herein provides a selectivity to methane formation at operating temperatures between about 375° C. and about 450° C. is less than 2%. For example, the selectivity to methane formation can be less than 2%, 1.8%, 1.6%, 1.4%, 1.2%, 1%, 0.8%, and/or 0.6%.

In general, the procedure for making the chromium-free catalyst described herein is schematically shown in FIG. 1. In an exemplary embodiment, first, a mixed salt solution containing the desired amount of Fe, Al, Zn and promoter, for example, Cu, is prepared in a container. Under the conditions of mechanical mixing, the salt solution and the precipitation agent are simultaneously pumped into a container at a required rate to maintain the pH value of the precipitated slurry at the desired pH. The precipitation is continued until all the salt solution is pumped out. The obtained slurry is then aged. The slurry is then filtrated and washed with DI $H_2O$ until the pH of filtrate is neutral. The cake is re-slurred and, if desired, an amount of $K_2CO_3$ can be added into the slurry for a time period under mixing. The slurry is then spray dried under controlled conditions and the collected powder from the spray dryer is calcined in a furnace for duration of 2-5 hours. The calcined catalyst powder is then sieved to obtain the catalyst material in the desired particle size range (about 40-150 μm).

EXAMPLES

Testing was performed to evaluate different catalyst formulations. As a part of testing, catalyst activity and attrition resistance were assessed.

Example 1. Microreactor System

Figure 2:
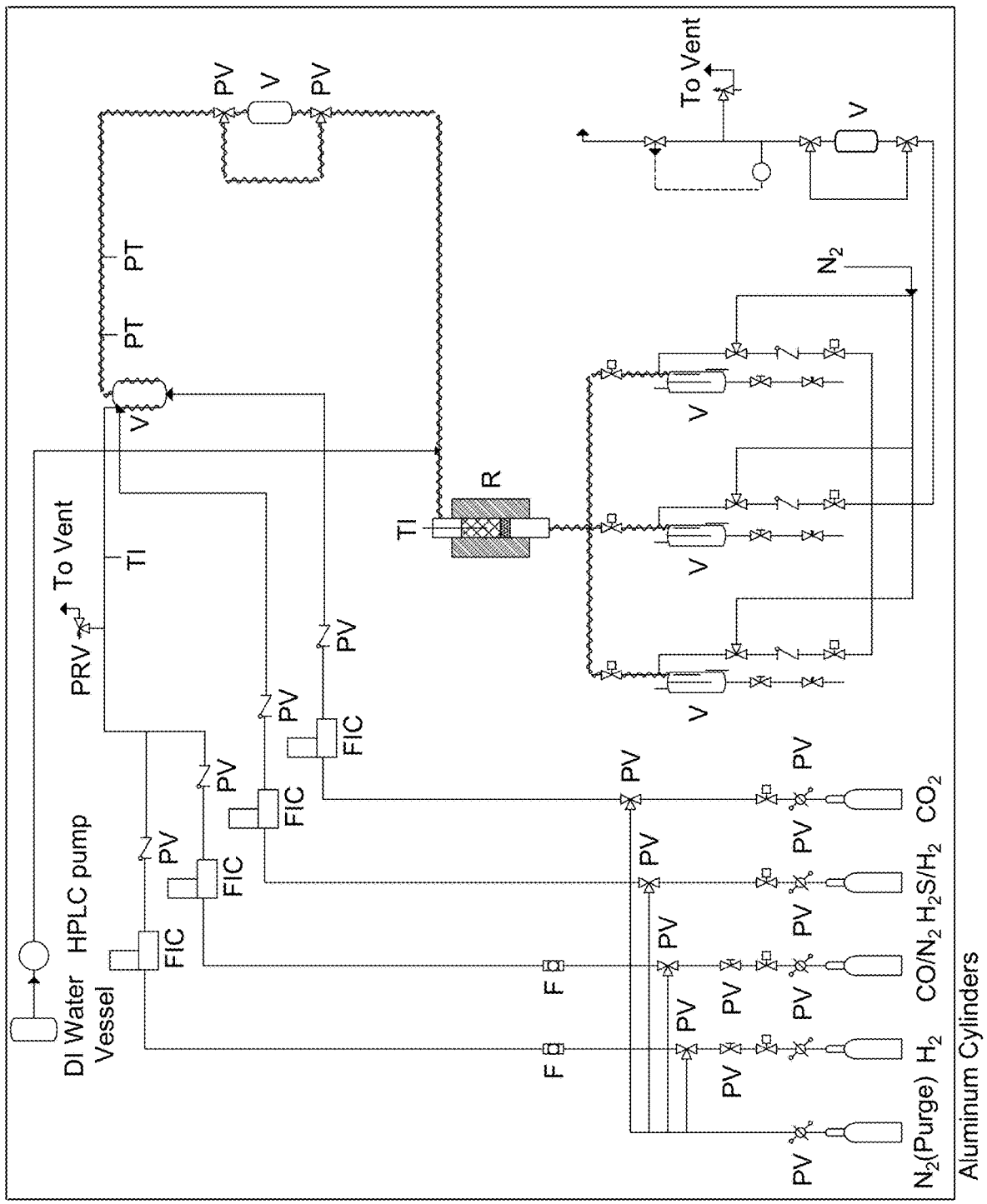
FIG. 2 is a process flow diagram of the microreactor system used for the Examples.

Performance of exemplary high-temperature water gas shift catalysts was evaluated in a packed-bed microreactor system with simulated syngas mixtures. The process flow diagram for the microreactor system is shown in FIG. 2.

Reactant and purge gases were supplied from high pressure cylinders. Gas flows were controlled and monitored with mass flow controllers (MFCs). The gas supply lines downstream of the MFCs were heat traced for preheating the feed gases. The reactor was a 0.5 inch OD stainless steel tube surrounded by a heating jacket, which was uniformly heated using band heaters. The power output to these band heaters was controlled with feedback from a K-type thermocouple inside the reactor vessel. A 0.0625" diameter dual K-type thermocouple, inserted in a 0.125" thermowell tube through a bored-through Swagelok fitting, was used to monitor the temperature of the catalyst bed and control the reactor heater. Prior to loading in the reactor tube, catalyst particles (~100 microns) were mixed with α-alumina particles (~250 microns) to achieve a 3:1 alumina:catalyst ratio on a volume basis. The dilution helped control the temperature excursions in the reactor tube due to the WGS reaction exothermicity.

All process gas lines from after the MFCs to the condensation vessels were maintained around 140° C. The process lines were heat traced with heating tapes with their temperature being controlled by ladder logic PID loop using the Lookout software. Process relief valve were located upstream and downstream of the reactor system for system safety. Products and unconverted reactants exited the fixed-bed reactor and flowed into one of three condenser vessels. These vessels were cooled below 20° C. using thermoelectric coolers monitored with K-type thermocouples. Two of the collection vessels had an internal volume of 50 $cm^3$ and the third had an internal volume of 150 $cm^3$, allowing condensation products to be continuously collected for 24-72 hrs. Liquid products were manually drained at room temperature using the combination of ball and needle valves downstream of the condensers. One of the three condensers was used at any time during the run, while the other two condensers stayed isolated and could be brought online as required using the solenoid valves to direct the product flow.

Dry gas samples from the systems were analyzed by an Agilent 3000 gas analyzer (Micro GC). The Micro GC was calibrated for Argon, $H_2$, CO, $CO_2$ and $C_1$ to $C_6$ hydrocarbons (namely n-alkanes and 1-alkenes). An Argon (Ar) tracer was used in the feed gas to quantify product gas flow rates.

The active catalyst layer in the reactor tube was comprised of a 3:1 alumina:catalyst ratio on a volume basis sandwiched between two inert layers of alumina. The catalyst loading in the reactor tube was about ~2.69 g. The catalyst was reduced in-situ under the syngas environment. Two types of catalyst performance tests, activity test and long-term stability test, were designed to understand the catalyst application for a transport reactor application. The activity test, which was designed over a temperature range or 300-400° C., helped understand the catalyst performance as it would transport from the mixing column to the riser in the transport reactor. The catalyst performance at the low temperature was important to understand the limitation of the minimum feed temperature for the feed entering the bottom of the transport reactor. Table 3 lists the reaction conditions for the catalyst performance tests.

TABLE 3

| Reaction Conditions for Catalyst Performance tests | | |
|---|---|---|
| Reaction Condition | Activity Test | Stability Test |
| Temperature [° C.] | 300-450 | 375 |
| Pressure [psig] | 500 | 500 |
| Space velocity at STP [$h^{-1}$] | 5,000 | 5,000 |

TABLE 3-continued

Reaction Conditions for Catalyst Performance tests

| Reaction Condition | Activity Test | Stability Test |
|---|---|---|
| Component [vol %] | | |
| $H_2$ | 17.7 | 17.7 |
| CO | 23.0 | 23.0 |
| $CO_2$ | 10.6 | 10.6 |
| $CH_4$ | 2.8 | 2.8 |
| $H_2O$ | 45.9 | 45.9 |

Example 2. Catalyst Performance of Commercial Catalyst

Figure 3A:
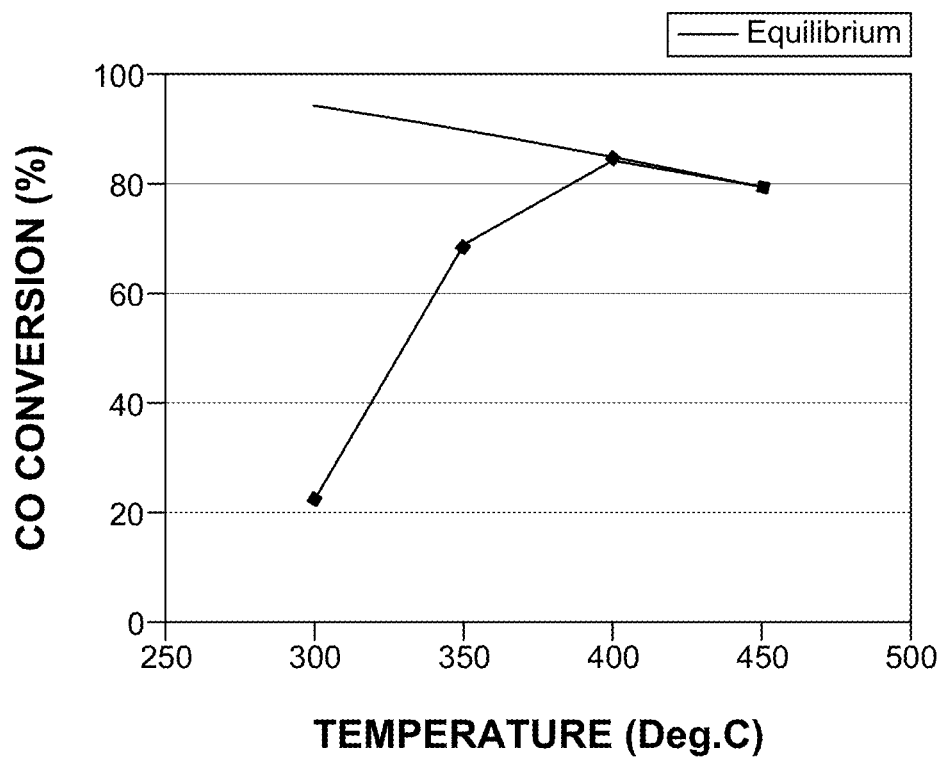
FIGS. 3A and 3B are as follows: 3A—commercial catalyst performance at equilibrium, 3B: commercial catalyst performance for the HT-WGS reaction.
Figure 3B:
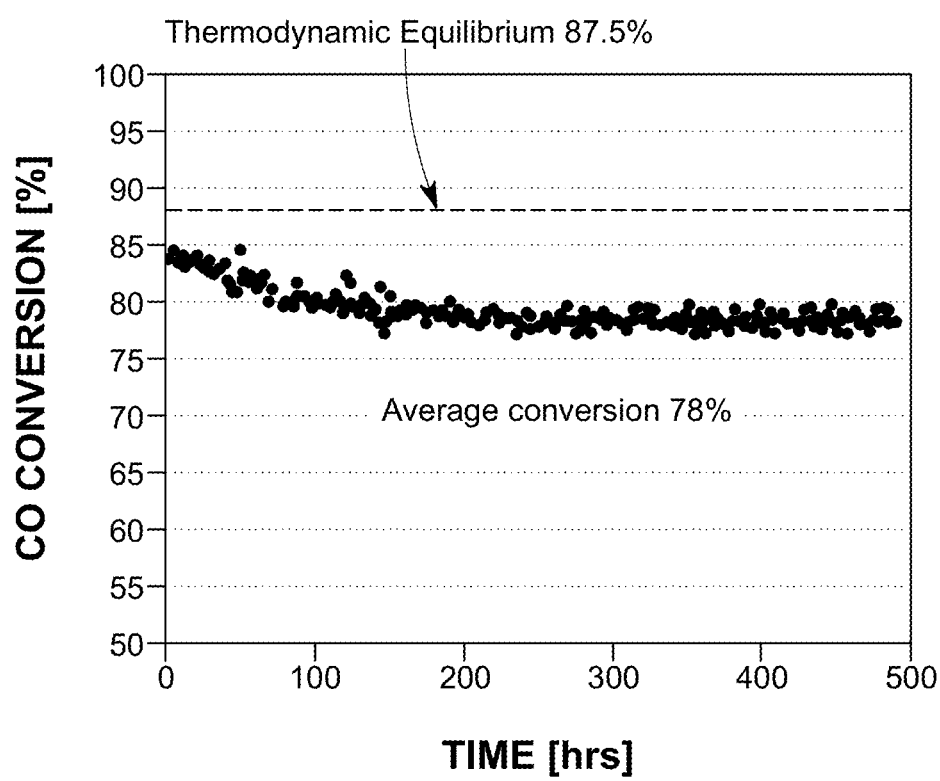

Performance of a commercially-available high-temperature water gas shift catalyst was evaluated in order to compare with performance of catalysts described herein. Shiftmax 120®, which is available commercially from Clariant, was used as the commercial catalyst for comparison. Shiftmax 120® is an Fe/Cr catalyst used for high-temperature water gas shift reactions in fixed bed reactors. FIGS. 3A and 3B show the performance of the commercial catalyst. FIG. 3A shows CO conversion as a function of temperature, and FIG. 3B shows CO conversion for a time on stream of 500 hours.

FIG. 3A shows that maximum CO conversion occurred around 400° C., and that the conversion was observed to drop with the increase and the decrease in the temperature. These results suggest that the WGS reaction on the commercial catalyst is kinetically limited at the temperatures below 400° C. and is thermodynamically limited above 400° C. FIG. 3B shows the catalyst performance as a function of time on stream (hrs). As can be seen from the plot, the commercial catalyst exhibited a stable CO conversion of about 78% over the run time of 500 hours.

Example 3. Effect of Iron Concentration on Catalyst Activity

A series of catalysts with different iron oxide content, 0 to 65 wt %, were prepared and performance tested. Table 4 lists the iron content of the prepared catalysts. Additional components are not included in the table. Amounts shown are in wt % of total catalyst weight.

TABLE 4

Characterization results for Catalyst Samples with varying Iron content

| | Sample A | Sample B | Sample C | Sample D | Sample E |
|---|---|---|---|---|---|
| $Fe_2O_3$ | 0 | ~50 | ~55 | ~60 | ~65 |
| Catalyst Characterization Results | | | | | |
| BET SA $m^2/g$ | 74.68 | 66.97 | 64.47 | 69.75 | — |
| Attrition (DI % 21/42 μm) | 0.97/3.45 | 1.57/4.42 | 65/78 | 72.40/57.0 | — |
| Density (g/cc) | 1.75 | 1.46 | 0.92 | 0.42 | — |

Characterization results for the catalysts revealed that water gas shift catalysts with up to 50% iron oxide exhibited attrition resistance less than 6%. However, the attrition numbers showed a sudden jump, from 1.57% to 65% as iron content increased over 50 wt %. Additionally, density showed a significant drop when iron oxide was increased above 50 wt %. BET surface area remained relatively consistent (about 60 to about 70 $m^2/g$) over the studied iron content range.

Figure 4:
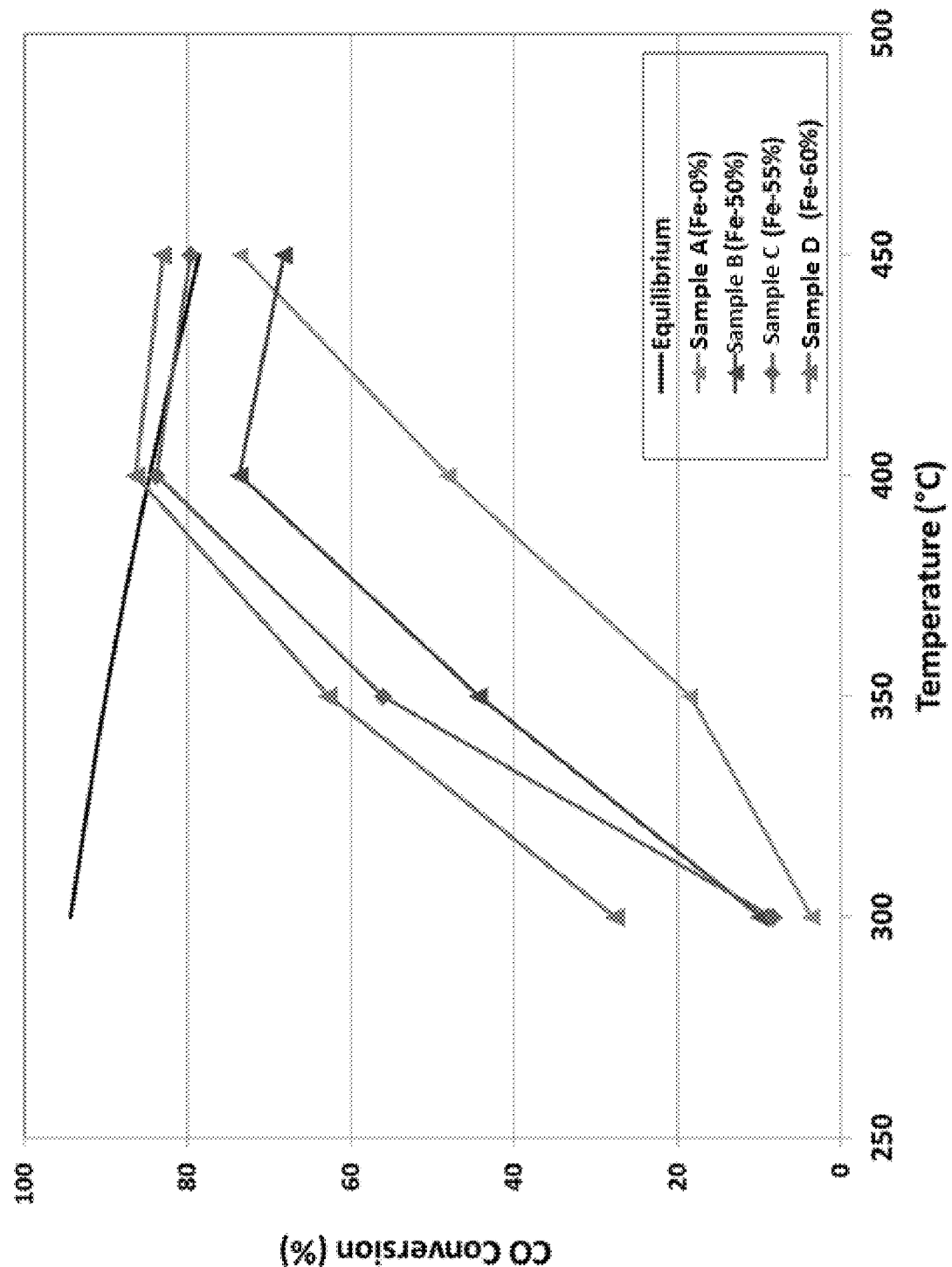
FIG. 4 is a chart showing catalyst performance as a function of iron content.

FIG. 4 presents the catalyst performance results for this group of catalyst samples. As can be seen in FIG. 4, catalyst activity, expressed as CO conversion, increased with increasing iron content in the catalyst sample. Catalyst samples with iron content of 55-60 wt % achieved equilibrium CO conversion values at reaction temperatures≥400° C. Moreover, catalyst with higher iron content also had better activity at lower temperatures (<350° C.). As expected, catalysts with no iron exhibited very sluggish performance.

The exemplary catalyst with 50% iron oxide was found to have good attrition resistance and reasonably high catalytic activity. Catalysts with higher iron oxide (55% or higher) exhibited higher activity, but were found to be physically weak with lower attrition resistance.

Example 4. Improvement of Catalyst Performance Through Promoters

Three types of promoters were tested to evaluate catalyst performance.
Effect of Copper Content on Catalyst Attrition and Activity.

HT-WGS catalysts with copper content up to 10 Wt % were prepared and tested. Table 5 provides copper content for the catalyst compositions and characterization results for these samples. Additional components were held relatively constant and are not included in the table. Amounts shown are in wt % of total catalyst weight.

As shown in Table 5, the addition of a relatively small percentage of copper oxide had little effect on BET surface area and particle density. However, the addition of a relatively small percentage of copper oxide had an impact catalyst attrition. When the copper oxide content was increased from 6.0 to 10 wt %, the attrition value increased from 1.57 to 6.06 or 6.39. Thus, it is expected that a further increase in copper oxide content would further weaken the catalyst.

TABLE 5

Characterization results for Catalyst Samples with varying Copper content

| | Sample B | Sample F | Sample G | Sample H |
|---|---|---|---|---|
| CuO | ~6 | ~0 | ~10 | ~10 |
| $Fe_2O_3$ | up to 65 | up to 65 | up to 65 | up to 65 |
| Catalyst Characterization Results | | | | |
| BET SA $m^2/g$ | 66.97 | 67.80 | 65.03 | 53.49 |
| Attrition (DI % 21/42 um) | 1.57/4.42 | 1.47/5.32 | 6.06/15.46 | 6.39/10.48 |
| Density (g/cc) | 1.46 | 1.42 | 1.61 | 1.71 |

Figure 5:
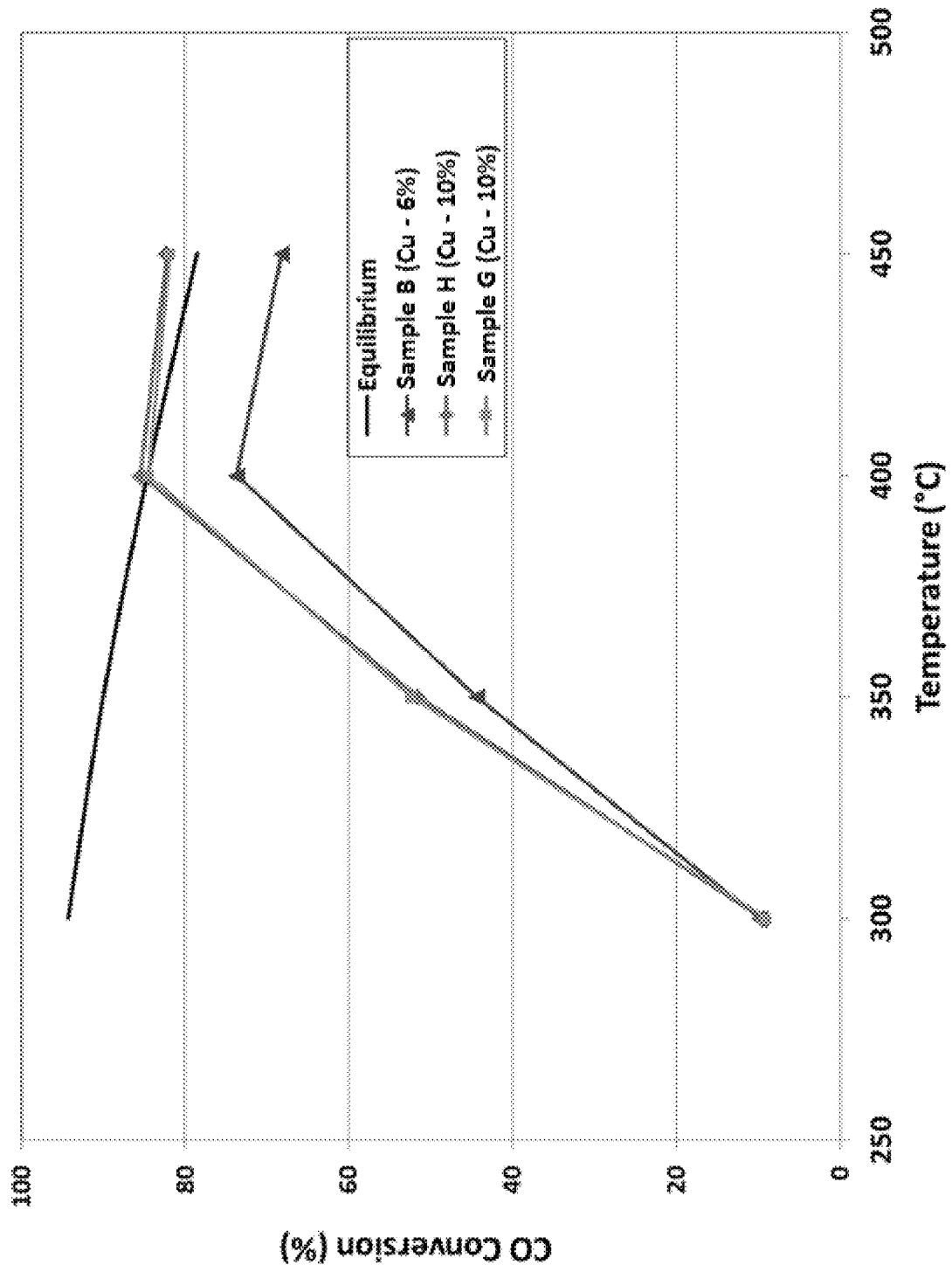
FIG. 5 is a chart showing catalyst performance as a function of copper content.

Catalyst activity was evaluated for the samples with varying copper content. The results are shown in FIG. 5. As can be seen from FIG. 9, the catalyst with 10 wt % copper oxide exhibited a higher CO conversion compared to the catalyst with 6 wt % copper oxide.
Effects of Potassium Content on Catalyst Performance It is believed that the presence of alkali metal in a water-gas-shift catalyst can suppress the formation of hydrocarbons and potentially increase catalyst life time. Thus, HT-WGS catalysts with relatively higher K content (up about 8.0 wt % as $K_2CO_3$) were evaluated. The K content in the catalyst composition and characterization results are listed in Table 6 and the catalyst performance data is presented in FIG. 6. Additional components were held relatively constant and are not included in the table. Amounts shown are in wt % of total catalyst weight.

TABLE 6

Catalyst Samples with different K content

|  | Sample I | Sample B |
|---|---|---|
| $Fe_2O_3$ | up to 65 | up to 65 |
| $K_2CO_3$ | 8 | ~4.5 |
| Catalyst Characterization Results | | |
| BET SA $m^2/g$ | 65.98 | 66.97 |
| Attrition (DI % 21/42 um) | 1.68/4.78 | 1.57/4.42 |
| Density (g/cc) | 1.5 | 1.46 |

Figure 6:
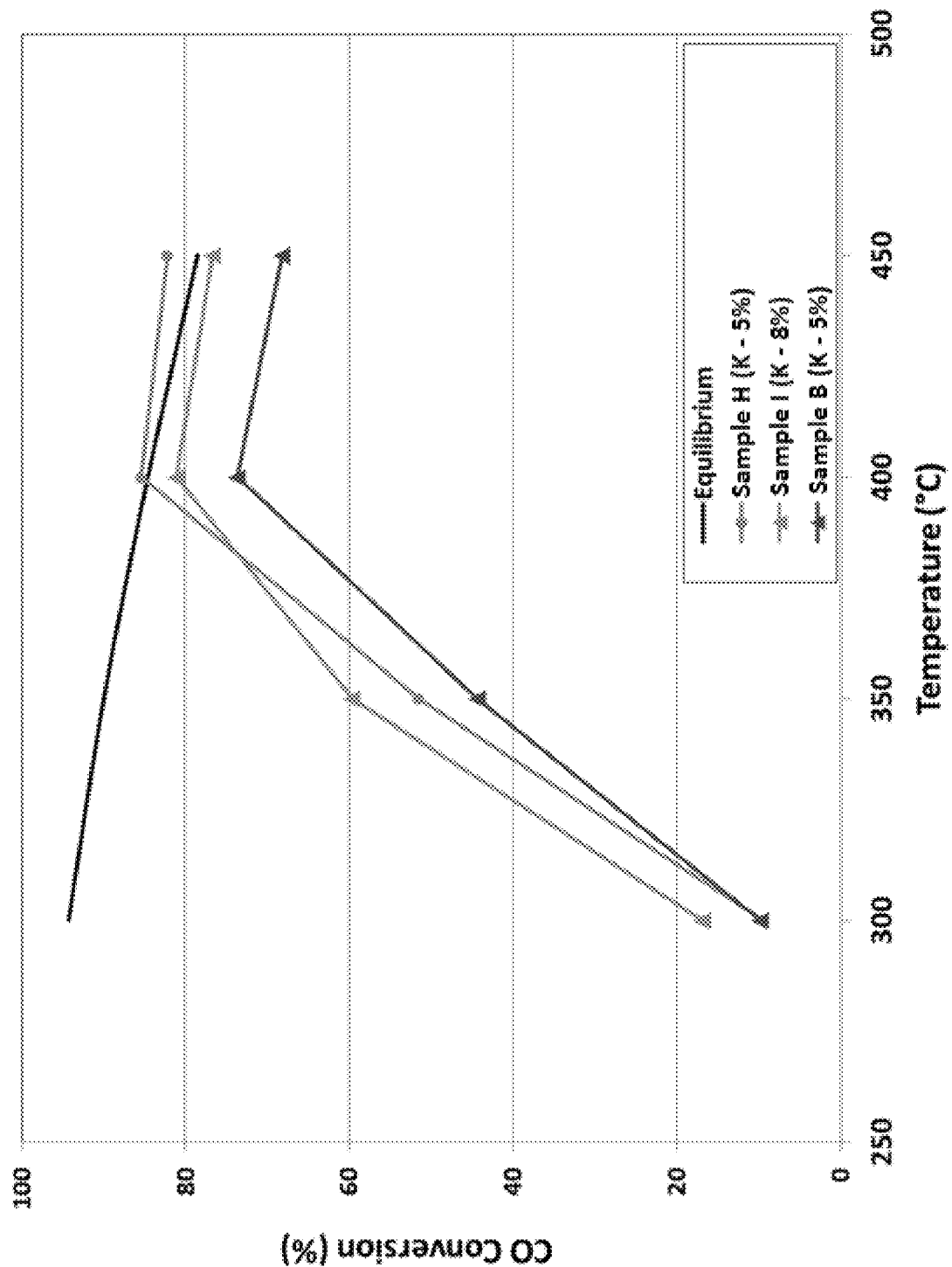
FIG. 6 is a chart showing catalyst performance as a function of K promoter content.

As shown in Table 6, increasing the K content from 5% to 8% did not significantly impact the BET surface area and attrition resistance. All samples had a similar Fe content. The amount K varied in the samples. As seen in FIG. 6, the sample with higher K content (8 wt % vs. 5 wt %) had decreased activity at 400° C. Although not shown, hydrocarbon formation, which was expressed as methane selectivity, was very minimal with selectivity numbers ranging around 1%. Also, no higher hydrocarbon formation (C1+) was detected by GC.

Effect of MgO and $CeO_2$ on Catalyst Attrition and Performance.

Figure 7:
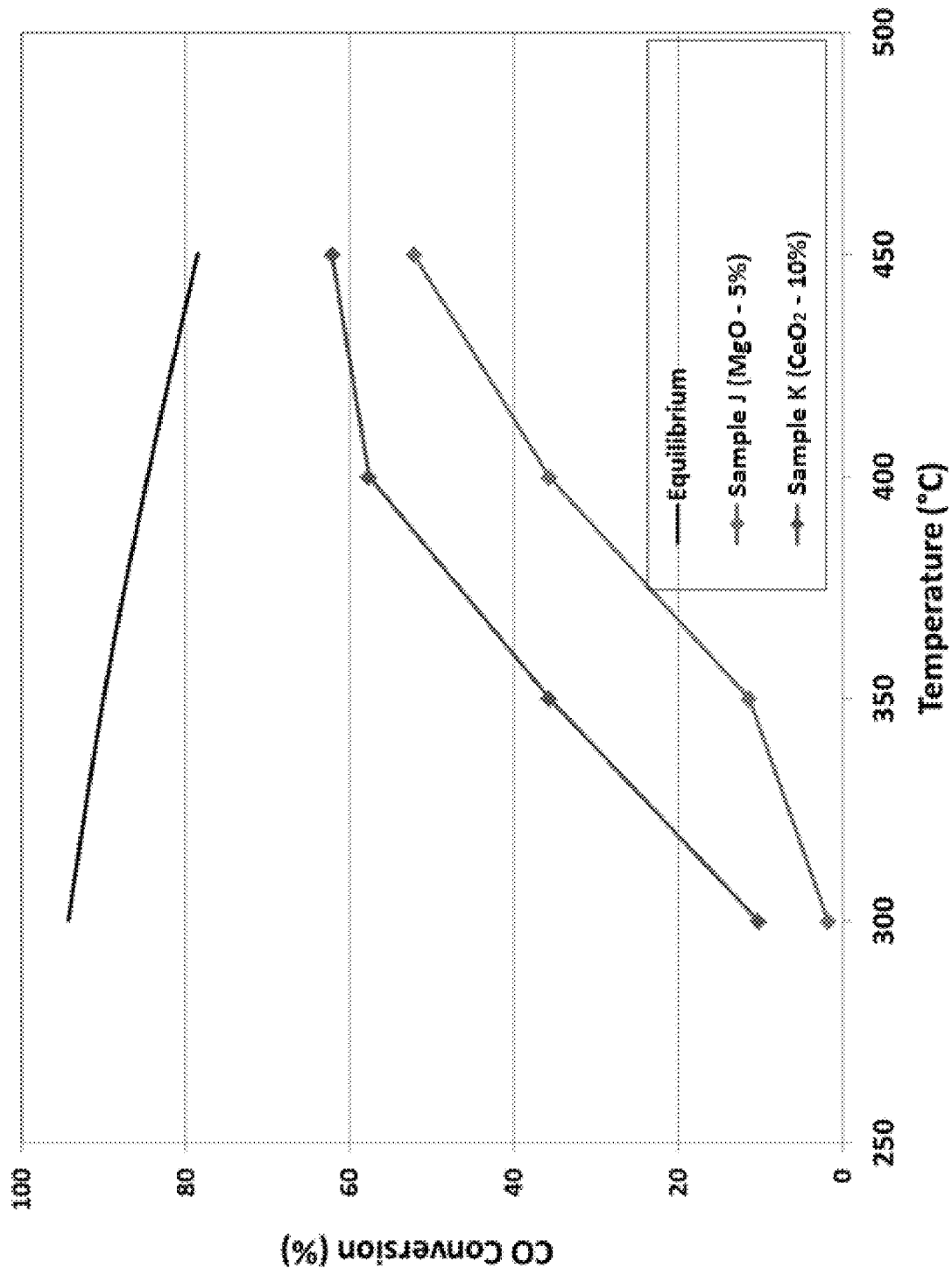
FIG. 7 is a chart showing catalyst performance with different types of promoters.

Two catalyst samples, one containing 5% MgO and one containing 10% $CeO_2$, were prepared and evaluated. Table 7 presents the MgO and $CeO_2$ content in the catalyst composition and characterization results for these samples. FIG. 7 presents the catalyst performance results. The catalyst properties in Table 7 show that addition of MgO or $CeO_2$ had little impact on catalyst BET surface area and attrition resistance. However, FIG. 7 shows that both additives negatively impacted catalyst activity. Additional components are not included in the table. Amounts shown are in wt % of total catalyst weight.

TABLE 7

Catalyst Characterization results for Catalyst Samples with MgO or $CeO_2$

|  | Sample J | Sample K |
|---|---|---|
| $Fe_2O_3$ | up to 65 | up to 65 |
| MgO | 4.58 | N/A |
| $CeO_2$ | N/A | 10 |
| Catalyst Characterization Results | | |
| BET SA $m^2/g$ | 65.3 | 57.8 |
| Attrition (DI % 21/42 um) | 3.1/11.6 | 1.70/5.78 |
| Density (g/cc) | 1.87 | 1.6 |

Example 6. Long-Term Stability of Exemplary Chromium-Free Catalyst

Figure 8:
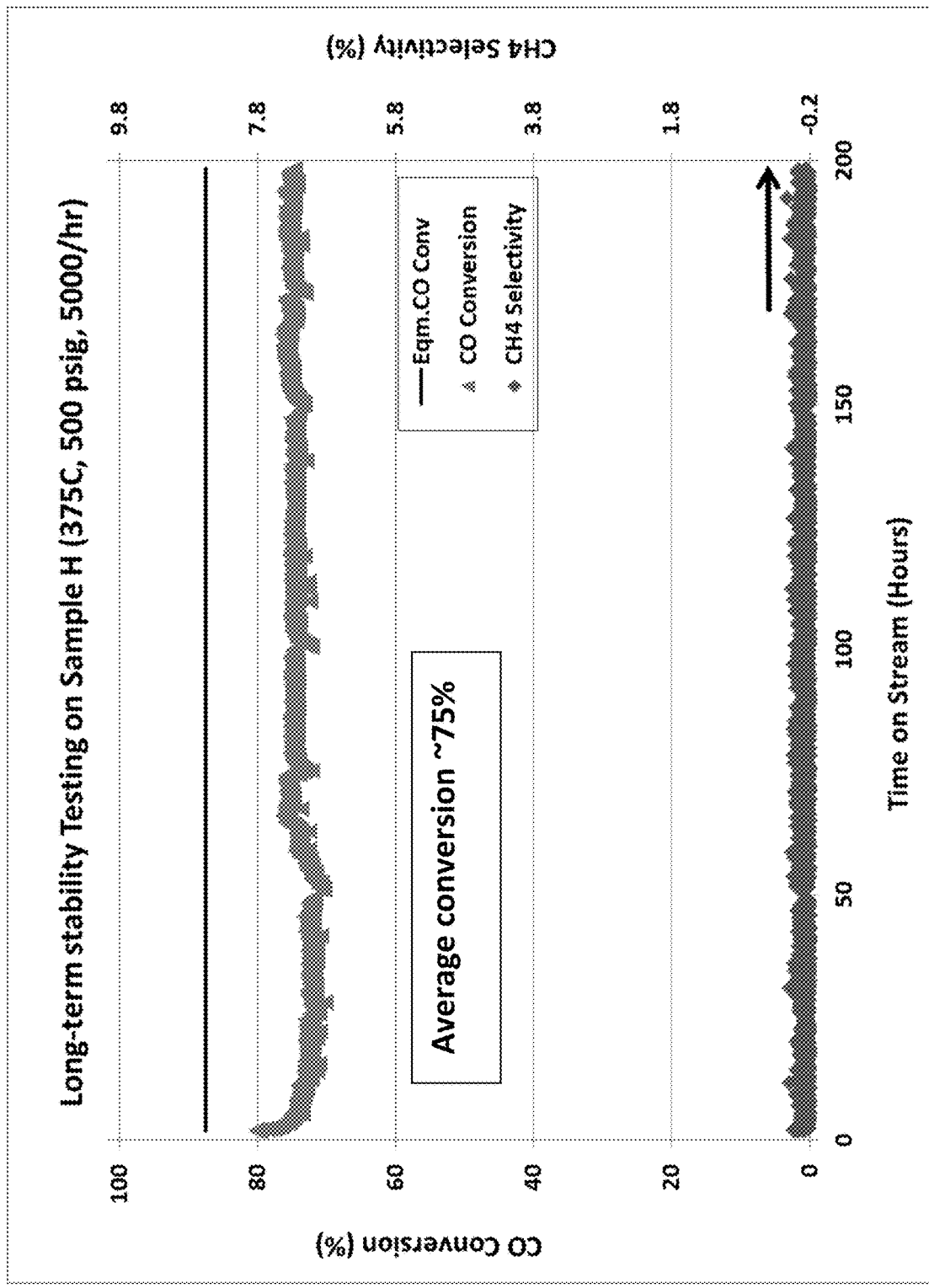
FIG. 8 is a chart showing catalyst performance of an exemplary embodiment as a function of TOS (hrs).

An exemplary catalyst having a composition comprising 45-65 wt % Fe oxide, 5-15 wt % Cu oxide, and 4-6 wt % K oxide was used in a long-term catalytic test to evaluate its stability. FIG. 8 presents the results of the catalyst performance as a function of time-on-stream in hours. As shown in FIG. 8, the exemplary catalyst exhibited stable CO conversion for a duration of about 200 hours on stream, with a negligible selectivity towards methane formation. The stable CO conversion was found to be about 75%, which is comparable to that exhibited by the commercial HT-WGS catalyst that was tested, which had a CO conversion of about 78%.

Example 7. Long-Term Stability of Exemplary Chromium-Free Catalyst

An additional sample with composition 45-65 wt % iron oxide, 5-15 wt % CuO, 4-6 wt % $K_2CO_3$, and 30-55 wt % ZnO+$Al_2O_3$ was tested for long-term stability. FIG. 9 presents the results of the long-term stability test by plotting CO conversion as a function of time on stream in hours.

As shown in FIG. 9, the average CO conversion was about 77-78% for 500 hours, which matches with that observed for the commercial fixed-bed catalyst Shiftmax 120®. Also, the nature of the CO conversion curve for the exemplary chromium-free, fluidized bed catalyst matches very well with that observed for the commercial catalyst.

Any patents or publications mentioned in this specification are indicative of the levels of those skilled in the art to which the invention pertains. These patents and publications are herein incorporated by reference to the same extent as if each individual publication was specifically and individually indicated to be incorporated by reference.

The invention claimed is:

1. Fluidizable and attrition-resistant chromium-free catalyst for use in water gas shift reaction in a fluidized bed reactor, comprising
   45-70 wt % $Fe_2O_3$
   5-15 wt % CuO
   20-35 wt % $Al_2O_3$
   10-25 wt % ZnO,
   1-15 wt % $K_2CO_3$
wherein the catalyst has a Davison Index (DI) of less than or equal to 15.

2. The catalyst of claim 1, having a BET surface area of about 10-60 $m^2/g$.

3. The catalyst of claim 1, having a density of about 0.8 to about 1.8 g/ml.

4. The catalyst of claim 1, comprising about 4-6 wt % $K_2CO_3$.

5. The catalyst of claim 1, comprising about 50-60 wt % $Fe_2O_3$.

6. The catalyst of claim 1, comprising about 20-25 wt % $Al_2O_3$.

7. The catalyst of claim 1, comprising about 10-15 wt % ZnO.

8. The catalyst of claim 1, comprising about 5-10 wt % CuO and optionally 0 to 15 wt % MgO and/or optionally 0 to 15 wt % $CeO_2$.

9. The catalyst of claim 1, wherein the DI is between about 5 and about 7.

* * * * *